United States Patent [19]

Kamata et al.

[11] Patent Number: 4,520,087
[45] Date of Patent: May 28, 1985

[54] DIVALENT SILVER OXIDE CELL INCLUDING CADMIUM AND TELLUNIUM

[75] Inventors: Nobuo Kamata; Takashi Sekiya; Kazutoshi Takeda; Toyoo Hayasaka; Tomohisa Yoshida, all of Tokyo, Japan

[73] Assignee: Kabushiki Kaisha Daini Seikosha, Tokyo, Japan

[21] Appl. No.: 593,196

[22] Filed: Mar. 27, 1984

Related U.S. Application Data

[63] Continuation of Ser. No. 421,794, Sep. 23, 1982.

[30] Foreign Application Priority Data

Mar. 5, 1982 [JP] Japan .................................. 57-34950

[51] Int. Cl.³ ............................................ H01M 4/34
[52] U.S. Cl. .................................... 429/219; 429/217; 429/218; 429/222

[58] Field of Search ............... 429/219, 222, 218, 206, 429/217, 57

[56] References Cited

U.S. PATENT DOCUMENTS

| 3,650,832 | 3/1972 | Tvarusko | 429/219 X |
| 4,021,598 | 5/1977 | Naruishi et al. | 429/219 X |
| 4,038,467 | 7/1977 | Lippold et al. | 429/219 |
| 4,096,328 | 6/1978 | Kayama et al. | 429/219 X |
| 4,250,234 | 2/1981 | Langan | 429/219 X |
| 4,338,385 | 7/1982 | Ohya et al. | 429/206 |

Primary Examiner—Anthony Skapars
Attorney, Agent, or Firm—Robert E. Burns; Emmanuel J. Lobato; Bruce L. Adams

[57] ABSTRACT

A divalent silver oxide cell having a negative electrode, a positive electrode mixture mainly of AgO, a separator between the negative electrode and the positive electrode mixture of an electrolyte. The positive electrode mixture contains Cd and Te so as to stabilize the AgO.

7 Claims, 10 Drawing Figures

Gassing with various additives to AgO

Gassing with various additives to AgO

O₂ gassing volume with amount of Cd and Te

AgO content as a function of time

Capacity degradation vs storage at 60°C and room temp.

DIVALENT SILVER OXIDE CELL INCLUDING CADMIUM AND TELLUNIUM

This is a continuation of application Ser. No. 421,794, filed Sept. 23, 1982 which claims priority of Japanese patent application No. 34950/82 filed Mar. 5, 1982.

BACKGROUND OF THE INVENTION

The present invention relates to a divalent silver oxide cell, and more particularly to a divalent silver oxide cell with a remarkably improved electrical characteristic, storing characteristic and leakage resistant characteristic by improvement of its stability in the alkaline solution and of the manufacturing method of its positive electrode.

A conventional divalent silver oxide cell, without a stabilizer lacks stability since $O_2$ gassing volume caused by dissolution aqueous alkaline solution is large. Thus the conventional divalent silver oxide is disadvantageous in that it dissolves by itself in aqueous alkaline solution to reduce the electrical capacity as the divalent silver oxide. Further the $O_2$ gas evolved by dissolution of the divalent silver oxide oxidizes a separator so as to deteriorate it or to promote the self-discharge of the cell. The $O_2$ gas at the positive electrode diffuses and penetrates into the negative electrode through the separator to oxidize zinc and deteriorates the electrical capacity thereof. The acceleration of oxidation of zinc causes the zinc surface to be coated with a passive coating layer such as zinc oxide and stops the discharge of the cell even if active zinc remains as the active material of the cell.

Thus the cell using the conventional unstable divalent silver oxide at the positive electrode without adding the stabilizer is inferior with respect to the storing characteristic.

The cell using the conventional divalent silver oxide which is unstable and easily dissolves in aqueous alkaline solution accelerates the leakage of the alkaline electrolyte to the outside since the internal pressure of the cell is raised by the $O_2$ gas gradually accumulated therein.

To eliminate the above—noted drawbacks a method of coating the surface of the AgO powder with plumbic acid silver is disclosed in U.S. Pat. No. 3,017,448. Since the surface of the AgO powder coated with the plumbic acid silver is hard to be reduced, the silver layer is hard to be formed on the surface of the positive electrode pellet and thus the battery impedance becomes higher.

The $O_2$ gassing volume in case Zn, Cd, Hg, Al, In, Tl, Sn, Pb or W are added to AgO powder by 1000 PPM has been investigated by Aldar Tvarusko in J. Electrochem. Soc:, 116, 1071 (1969). Further, the effect of Cd, Al, Pb, V and Cr presented in the above paper for improving the stability of AgO is not sufficient.

SUMMARY OF THE INVENTION

It is the general object of this invention to provide a divalent silver oxide cell with an excellent electrical characteristic, electric discharge characteristic, electrical characteristic after storage, conservation characteristic and leakage resistant characteristic by using a positive electrode mixture comprised mainly of divalent silver oxide including Cd and Te; or Cd, Te and one or more components selected from Hg, Tl, Ge, Y, Sn, W, La, rare earth element Zn, Se, and Al.

DESCRIPTION OF THE PREFERRED EMBODIMENTS

Figure 1:
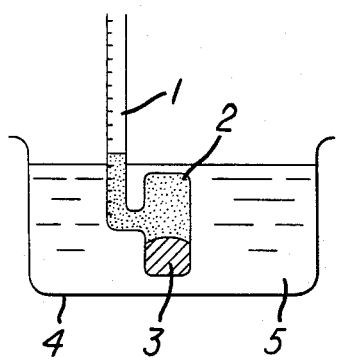
FIG. 1 is a schematic section view of an experimental device to measure $O_2$ gassing volume.

The stability of a new AgO powder used for a cell according to the present invention and a conventional AgO powder in aqueous alkaline solution has been comparatively examined by measuring the $O_2$ gassing volume of the two by the use of the experimental device in FIG. 1. The gassing volume is examined by changing the amount of a stabilizer added to the AgO powder.

In the figure, reference numeral 1 denotes a graduated glass tube, 2 denotes a 40% potassium hydroxide aqueous solution, 3 denotes a 1 g divalent silver oxide powder, 4 denotes a thermostat and 5 denotes a 40° C. or 60° C. aqueous solution.

EXAMPLE 1

Figure 2:
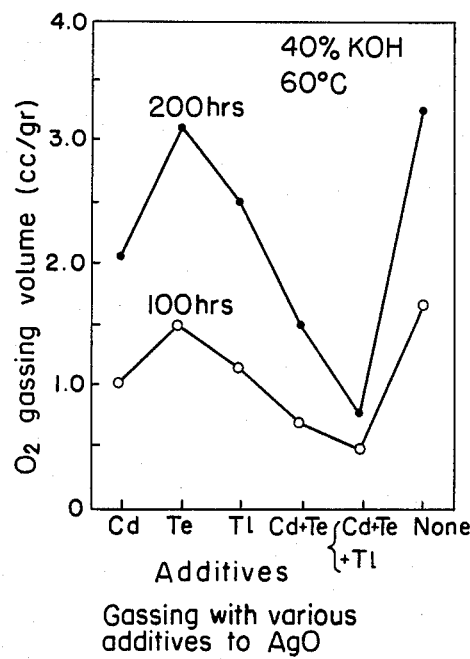
FIG. 2 shows $O_2$ gassing volume with various additives to AgO.

FIG. 2 shows $O_2$ gassing volume with various additives to AgO.

The additives are added to AgO as metal elements in the form of CdO, $TeO_2$, $Tl_2O_3$ by 0.3%, 0.1% and 0.1% respectively.

It is clear from FIG. 2 that $O_2$ gassing volume with $CdO+TeO_2$ and $CdO+TeO_2+Tl_2O_3$ to AgO is extremely reduced in comparison with AgO without additives.

Table 1 shows that AgO is stabilized more with various additives in addition to $CdO+TeO_2$.

TABLE 1

| additives | | gassing volume (l/g 200 hours) |
|---|---|---|
| conventional AgO | — | 523 |
| new AgO | $CdO + TeO_2$ | 46 |
| | $CdO + TeO_2 + PbO$ | 14 |
| | $CdO + TeO_2 + Tl_2O_3$ | 6 |
| | $CdO + TeO_2 + GeO_2$ | 11 |
| | $CdO + TeO_2 + HgO$ | 8 |

In the table, CdO is added to AgO as the element Cd in an amount of 0.3%; $TeO_2$, PbO, $Tl_2O_3$, $GeO_2$, and HgO are added to AgO as Te, Pb, Tl, Ge, and Hg in an amount of 0.1%.

Thus, it is assumed that the divalent silver oxide containing additives is stabilized in aqueous alkaline solution since ion species of contained metal elements or metal compounds are introduced into a crystal lattice of divalent silver oxide to consolidate the structure of crystals, but the correct stabilizing mechanism remains unexplained.

EXAMPLE 2

Figure 3:
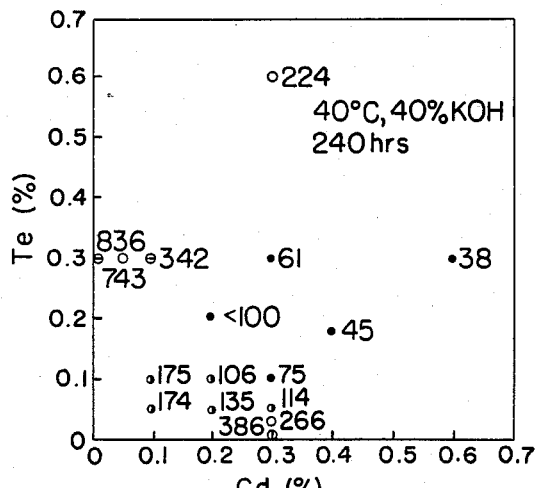
FIG. 3 shows the relationship between $O_2$ gassing volume and the amount of Cd and Te.

FIG. 3 shows the relationship between $O_2$ gassing volume with the amount of Cd and Te added to AgO. Numerals in the figure denote gassing volume of 1 g AgO in 40% KOH aqueous solution at 40° C. after 240 hours.

Cd and Te are added to AgO as the compounds CdO and $TeO_2$.

The figure shows that $O_2$ gassing volume is smaller as the amount of Cd increases. While the $O_2$ gassing volume is small when the amount of Te is within the range of 0.05–0.3%.

Since the electrical capacity of the positive electrode mixture comprised mainly of AgO reduces by adding the above-noted additives, Cd:Te=0.3%:0.1% (CdO:-$TeO_2$=0.34%:0.13%) is selected to assure the electrical capacity and to minimize the $O_2$ gassing volume.

Hereinafter the present invention will be illustrated with respect to AgO with additives in which Cd:Te:Tl are in the ratio of 0.3:0.1:0.1%.

EXAMPLE 3

TABLE 2

| AgO | AgO content (%) | $O_2$ gassing volume ($\mu$l/200 hr) in 40 KOH 40° C. | $Ag_2O_3$ content (%) | Average particle size ($\mu$) | Apparent density (g/cc) | Apparent tapping density (g/cc) |
|---|---|---|---|---|---|---|
| New | 98.3 | 16 | 0.41 | 2.96 | 0.79 | 1.95 |

Table 2 shows the chemical and physical properties with AgO to which CdO, $TeO_2$ and $Tl_2O_3$ are added in the ratio that Cd:Te:Tl=0.3:0.1:0.1%. It shows that the divalent silver oxide cell according to the present invention contains high AgO content and small $O_2$ gassing volume. Since the average powder diameter, apparent density and apparent tapping density are large, the fluidity of AgO powder is excellent and the molding characteristic of the pellents is improved.

EXAMPLE 4

Figure 4:
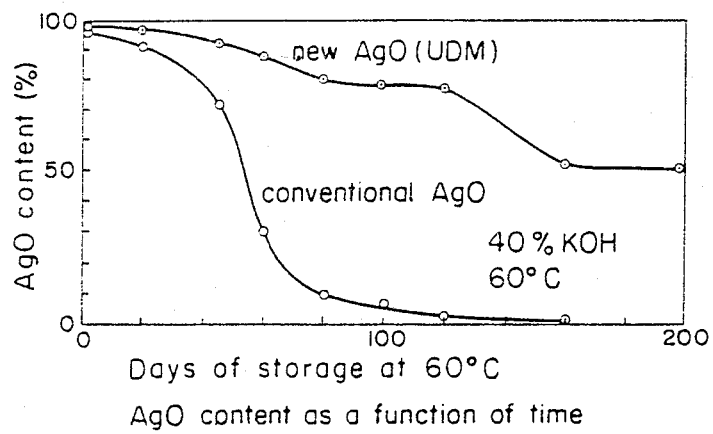
FIG. 4 shows the relationship between days of storage of new AgO and conventional AgO in 40% KOH at 60° C. and AgO content.

FIG. 4 shows the relationship between AgO content and time of new AgO to which CdO, $TeO_2$, $Tl_2O_3$ are added in the ratio that Cd:Te=0.3:0.1:0.1% and a conventional AgO to which no additives are added. A generally adopted method, i.e., potassium iodide reduction titration method is applied for the quantitative analysis of AgO content.

The AgO sample is soaked in 60° C. 40% KOH solution and quantative analysis of AgO contents is carried out every 20 days.

The figure shows that the difference in AgO contents between the new AgO powder and the conventional AgO powder becomes substantial after 40 days. And AgO content of the conventional AgO powder is reduced to 30% after 60 days and 10% after 80 days.

While AgO contents of new AgO powder holds 50% after 200 days. It shows that AgO contents of new AgO powders are stable for long term storage.

EXAMPLE 5

A new AgO cell using the new AgO powder has the structure illustrated in Examples 3 and 4.

Figure 5:
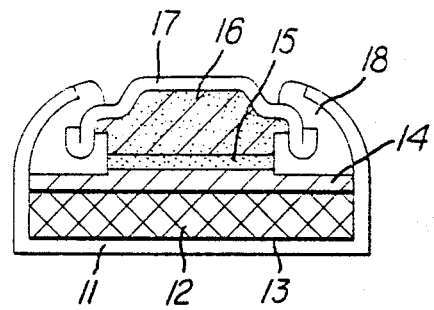
FIG. 5 is a section of a cell showing an embodiment of this invention.

FIG. 5 is a sectional view of a new AgO cell showing an embodiment of the present invention. In the figure, 11 denotes a positive electrode container in which a positive electrode mixture 12 coated with a reduced silver layer 13, a separator 14 and an electrolyte absorbent layer 15 are incorporated. The electrolyte is an aqueous alkaline solution mainly of NaOH (sodium hydroxide).

The positive electrode mixture 12 consisting of 95–99 weight-percent AgO powder and 1–5 weight percent polytetrafluoride ethylene is molded by pressure.

Stable materials with lubrication characteristic, organic binder characteristic necessary for pressure molding and with acid resistant and alkaline resistant characteristics are suitable for organic binder agent besides polytetrafluoride ethylene powders. For example, olefinic resin powders such as polyethylene and polystyrene, polyamide resin powders such as nylon, water soluble polymer powders such as carboxymethyl cellulose, polyvinyl alcohol, and polyacylic acid soda are suitable for organic binder agent.

The organic binder agent may be in the form of liquid such as a dispersion solution or water, not in the form of powder.

The lower limit value of the amount of additives of the organic binder agent is 1% in consideration of the binder effect. Although the upper limit value is not especially restricted, the amount of additives exceeding 5% causes the reduction of the cell capacity due to the reduction of the amount of AgO powders in the positive electrode mixture. Further, if a binder agent of more than 5% is added to the positive electrode mixture, the electric resistance within the positive electrode mixture goes up and the internal resistance of the cell increases since the binder agent is an electrically insulating material. Accordingly the amount of additives of the binder agent is preferably 1–5%. The stability of AgO used for the new cell is not deteriorated even if the amount of additives of the binder agent exceeds 5%.

In the figure, reference numeral 13 denotes a silver layer formed on the surface of the positive electrode mixture 12. The silver layer 13 is formed by reducing the surface of the positive electrode mixture 12 by some reducing means.

Reference numeral 17 denotes a negative electrode container in which a negative electrode mixture 16 consisting of a mixture of amalgamated zinc powders and one or two of carboxymethyl cellulose, sodium polyacrylic acid are contained. The negative electrode mixture is used as it is or in the form of gel with alkaline electrolyte.

The negative electrode mixture may be molded by slight presure.

Figure 6:
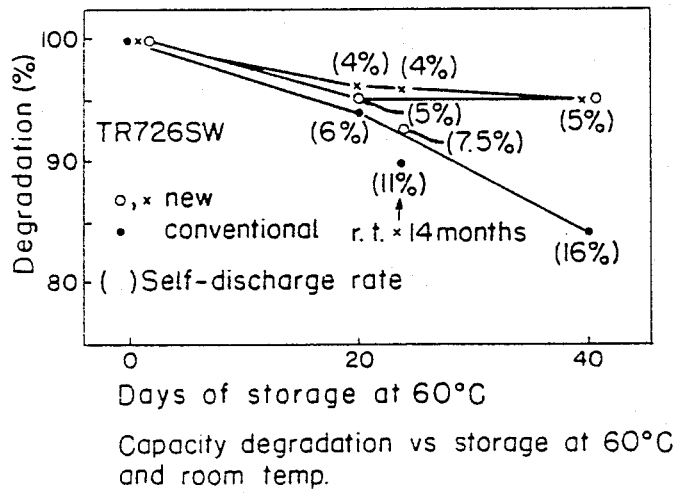
FIG. 6 shows the relationship between capacity degradation and storage at 60° C. and room temperature.

FIG. 6 shows the self-discharge rate of a TR726SW cell (outer diamer: 7.8 mm, height: 2.6 mm, Zn/NaOH-/AgO) which after 20 days or 40 days storage at 60° C. is extracted from the thermostat and discharged at 7.5K$\Omega$ load resistance and the remaining capacity is found.

The self-discharge rate of the cell is calculated after 20 days or 40 days storage at 60° C.

self-discharge rate = (initial capacity) −

-continued (remaining capacity after storage at 60° C.)/initial capacity × 100%

The data shows the average value when the number of samples n=24.

Further, the self-discharge rate of the new cell after 14 months storage at room temperature is compared with the conventional cell. The self-discharge rate of the new cell after 40 days storage at 60° C. is reduced to 1/3.2 in comparison with the conventional cell. The self-discharge rate of the new cell after 14 months storage at room temperature is reduced to 1/1.5–1/2.8 in comparison with the conventional type.

Figure 7:
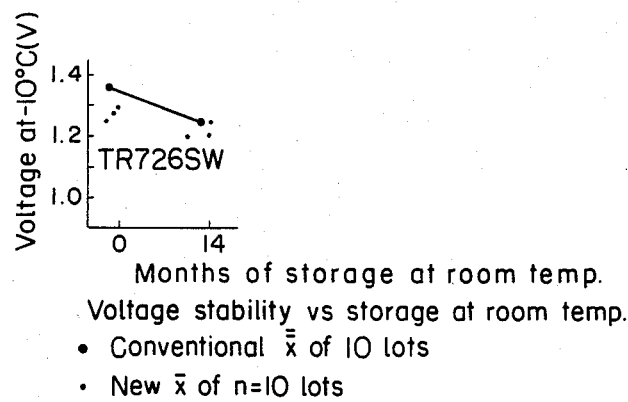
FIG. 7 shows the relationship between the cell voltage stability and the storage at room temperature.

Subsequently the low temperature characteristic of the cell is shown in FIG. 7.

The closed circuit voltage at −10° C. is the voltage when the cell is discharged for 7.8 m sec at $R_L = 2K\Omega$.

The new cell shows $\overline{X}$ of n=10 and the conventional cell shows X of 10 lots.

FIG. 7 indicates that the low temperature closed circuit voltage of the new cell is low at the initial stage, but a change with the passage of time is smaller.

The change with the passage of time of the low temperature closed circuit voltage of the new cell is smaller than the conventional cell because the new AgO powder is stable in aqueous alkaline solution and the silver layer formed on the surface of the positive electrode is rarely oxidized by $O_2$ gas due to decomposition of AgO and zinc used for the negative electrode is rarely oxidized.

As illustrated in Examples 1–5, the present invention provides a divalent silver oxide cell with excellent storage capacity, low temperature closed circuit voltage of small change with the passage of time, and extremely high reliability.

When the new AgO powder is used for a large current cell (Zn/KOH/AgO) for use in a liquid crystal display digital watch with lamp, however, the low temperature closed circuit voltage of the new AgO cell just after the manufacture is lower than the conventional AgO cell by 70–100 mV.

The above problem has been addressed by the following measures:
(1) Optimizing the amount of additives such as CdO, $TeO_2$ and $Tl_2O_3$.
(2) Eliminating Ag within the $Ag_2O$ layer interposed between the AgO and silver layer formed on the surface of the positive electrode.
(3) Equating the thickness of reduced silver layer on the surface of the positive electrode using the new AgO with the positive electrode using a conventional AgO.

The above approaches are verified by the following example.

EXAMPLE 6

First the amount of additives such as CdO, $TeO_2$, and $Tl_2O_3$ are optimized.

Figure 8:
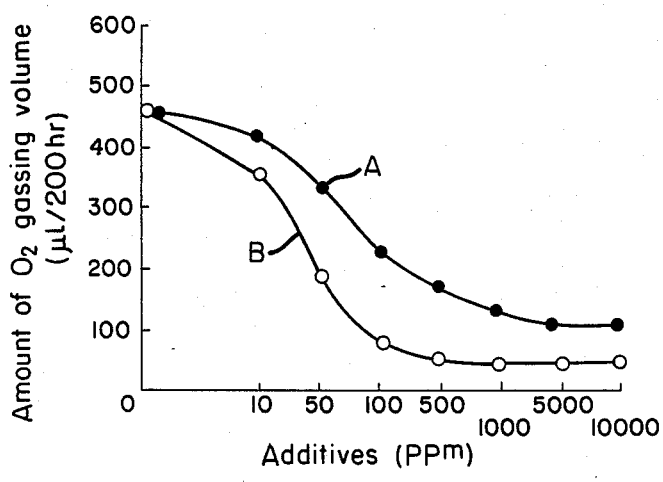
FIG. 8 shows the relationship between the amount of additives and the amount of $O_2$ gassing volume.

FIG. 8 shows the relationships between the amount of additives of stabilizer and $O_2$ gassing volume. In the figure, A denotes $CdO + TeO_2$ as stabilizer and B denotes $CdO + TeO_2 + Tl_2O_3$ as stabilizer. The point at which the amount of additives is zero is the $O_2$ gassing volume of a conventional AgO powder. FIG. 8 shows that $O_2$ gassing volume at B is smaller than at A. This is because thallium oxide is added besides cadmium oxide and tellurium dioxide.

$O_2$ gassing volume is smallest when the amount of additives is 5000–10000 PPM.

The contained components largely affect the stability of AgO powder in aqueous alkaline solution either in the form of metal element or metallic compound.

Subsequently, a new cell using AgO powder, in which the amount of additive of stabilizer is changed, is fabricated in a similar manner to Example 5. The cell in this example is TR926W (outer diameter: 9.5 mm, height: 2.6 mm, Zn/KOH/AgO, nominal 52 mAh).

The low-temperature characteristic, self-discharge rate and leakage occurrence rate of new cells after 3 months storage at room temperature are shown in Tables 3 and 4.

TABLE 3

| | Amount of additives (PPM) | | | Low-temperature characteristics | Self-discharge | Leakage occurrence |
| --- | --- | --- | --- | --- | --- | --- |
| | CdO | $TeO_2$ | Total | (V) | rate (%) | rate (%) |
| Conventional cell | 0 | 0 | 0 | 1.27 V | 15% | 30% |
| New cell A | 7 | 3 | 10 | 1.27 V | 12% | 15% |
| New cell B | 65 | 15 | 50 | 1.27 V | 11% | 15% |
| New cell C | 70 | 30 | 100 | 1.27 V | 10% | 13% |
| New cell D | 350 | 150 | 500 | 1.27 V | 10% | 13% |
| New cell E | 700 | 300 | 1000 | 1.25 V | 10% | 13% |
| New cell F | 3500 | 1500 | 5000 | 1.20 V | 10% | 12% |
| New cell G | 7000 | 3000 | 10000 | 1.10 V | 10% | 12% |

TABLE 4

| | Amount of additives (PPM) | | | | Low-temperature characteristics | Self-discharge | Leakage occurrence |
| --- | --- | --- | --- | --- | --- | --- | --- |
| | CdO | $TeO_2$ | $Tl_2O_3$ | Total | (V) | rate (%) | rate (%) |
| Conventional cell | 0 | 0 | 0 | 0 | 1.27 | 15 | 30 |
| New cell A' | 6 | 2 | 2 | 10 | 1.27 | 10 | 15 |
| New cell B' | 30 | 10 | 10 | 50 | 1.27 | 10 | 15 |
| New cell C' | 60 | 20 | 20 | 100 | 1.27 | 10 | 14 |
| New cell D' | 300 | 100 | 100 | 500 | 1.27 | 9 | 12 |
| New cell E' | 600 | 200 | 200 | 1000 | 1.23 | 8 | 10 |
| New cell F' | 3000 | 1000 | 1000 | 5000 | 1.17 | 7 | 10 |
| New cell G' | 6000 | 2000 | 2000 | 10000 | 1.05 | 8 | 10 |

Figure 9:
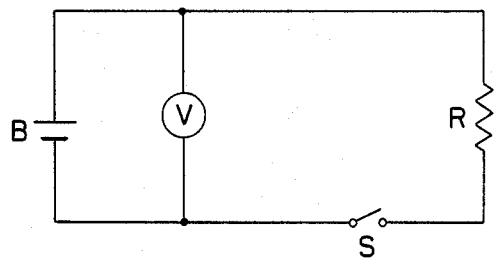
FIG. 9 is a circuit diagram used to measure cell voltage at $-10°$ C.

The low-temperature characteristic: The new cells are stored in the thermostat at −10° C., the switch S is closed by the measuring circuit in FIG. 9 and the minimum value of the closed circuit voltage within 5 seconds is read by the voltage meter V. The data show the average value when n=10.

Test method of the storage characteristic (measurement of self-discharge rate): The new cells stored at 60° C. in the thermostat are taken out after 40 days and discharged at the load resistance of 7.5K and the remaining capacity is found. The self-discharge rate is calculated by the following formula.

Self-discharge rate = [{(initial capacity) −

(remaining capacity after storage at 60° C.)}/initial capacity] × 100% where the initial capacity is the cell capacity before storage. The data shows the average value when n=24.

The leakage test method:

The new cells are stored in the temperature and humidity chamber at relative humidity of 90–95% and taken out after 1000 hours and the existance of leakage is observed by microscope. The cells with leakage at outer surfaces of the negative electrodes are defective. The data shows the leakage occurrence rate when n=100.

Table 3 shows the low-temperature characteristics, self-discharge rate and leakage occurrence rate of the cells in varying the amount of additives of stabilizer consisting of cadmium oxide and tellurium dioxide. The composition of the stabilizer is approximately in the ratio of $CdO:TeO_2=3:1$.

In the table a conventional cell uses AgO powders without containing the stabilizer, while new cells A–G uses AgO powders in which the amount of additives of the stabilizer is varied within the range of 10–10000 PPM.

It is clarified by the table 3 that the new cells A–G are extremely excellent compared to the conventional cell with respect to the self discharge rate and the leakage occurance rate.

The self-discharge rate and the leakage occurrence rate of the cells using AgO powders without adding the stabilizer is inferior because the AgO powders without containing the stabilizer gradually dissolve when in contact with aqueous alkaline solution.

The dissolution of the AgO powders causes the following phenomena:
(1) Reduction in the electrical capacity of AgO powders.
(2) Deterioration of separator and dissipation of zinc by the dissolution $O_2$ gassing of AgO powder.
(3) Increase in the internal pressure of cells by accumulation of the dissolution $O_2$ gassing of AgO powder.

The new cells are excellent because of the effect of the stabilizer contained in AgO.

The stabilizer largely affects the stability of AgO in aqueous alkaline solution of AgO powders in any form of an oxide, hydroxide, metal powder, sulfide, and all sorts of salt.

It is found that the low-temperature characteristics closely relate to the amount of additives of the stabilizer. Namely the low temperature characteristics become lower as the amount of additives of the stabilizer increases. The reason for it is assumed that the discharge reaction of AgO powder is difficult when discharged at a large current $RL=200\Omega$ since the stabilizer stabilizes AgO powder.

Since the low-temperature characteristics of a liquid crystal display digital watch with lamp require more than 1.05 V, it would be reasonable to regard the low-temperature characteristics value of the new cell F as the lowest limit value in view of dispersion etc. Namely, the self-discharge rate and the leakage occurrence rate of the new cell may be higher than the conventional cell, while keeping the low-temperature characteristics at a proper value, when the range of the amount of additives of the stabilizer is within the range of 10–5000 PPM.

Table 4 will be illustrated. Table 4 shows the low-temperature characteristics, self-discharge rate and leakage occurrence rate of the cells in varying the amount of additives of stabilizer consisting of cadmium oxide, tellurium dioxide and thallium oxide, in a similar manner to Table 3. The composition of the stabilizer is approximately in the ratio of $CdO:TeO_2:Tl_2O_3=3:1:1$.

As shown in FIG. 8, the AgO powder which contains the stabilizer consisting of CdO, $TeO_2$ and $Tl_2O_3$ is more stable than the AgO powder which contains the stabilizer consisting of CdO and $Tl_2O_3$ since the $O_2$ gassing volume in aqueous alkaline solution is small. Thus the new cells A′–G′ are found to be more excellent than the new cells A–G with respect to the self-discharge rate and leakage occurrence rate.

On the other hand, the low-temperature characteristics of the new cells A′–G′ are lowered with an increase in the amount of additives of the stabilizer in a similar manner to Table 2.

The low-temperature characteristics of new cells E′–G′ are still lower than new cells E–G. The reason for it is assumed that the AgO powders used for the new cells E′–G′ are more stable than the AgO powders used for the new cells E–G and that IR polarization is larger against the discharge reaction at $RL=200\Omega$ as reaction.

As illustrated, the present invention provides a divalent silver oxide cell with excellent low-temperature characteristics, storing characteristics and leakage resistant characteristics by using the positive electrode mixture chiefly of AgO powders containing the stabilizer of 10–5000 PPM as a positive electrode.

To yield a 1.55 V cell voltage, the divalent silver oxide cell using the conventional AgO powder forms a silver layer on the surface of the divalent silver oxide used for the positive electrode by the use of the reduction treatment and eliminates a high electric potential of 1.85 V (electric potential difference between AgO and zinc). The silver layer, however, changes to silver oxide by being oxidized gradually with the passage of time, and as a result the high electric potential (1.85 V) appears. It is assumed that the above drawback is caused by formation of partial metallic silver in the monovalent silver oxide layer formed between the divalent silver oxide cathode and the silver layer when the silver layer is formed on the surface of the divalent silver oxide cathode. Therefore an electronic insulation between the divalent silver oxide cathode and the silver layer is broken down. Since the silver layer on the surface is reoxidized, the following reaction proceeds and the internal resistance becomes higher.

$$AgO + Ag \rightarrow Ag_2O$$

The present invention aims to eliminate the above-noted drawbacks. This invention will be illustrated in conjunction with several Examples.

EXAMPLE 7

0.1% by weight CdO powder and 0.03% by weight $TeO_2$ are added to 95% by weight divalent silver oxide (AgO) and further 5% by weight of polytetrafluoride ethylene powder is added and mixed for 1 hour. The mixture is changed into particles and sifted and molded by pressure of 8 ton/cm² to make pellets. The pellets are soaked in 90% by weight methanol solution including 10% KOH for 30 minutes and washed. Further the pellets are soaked in 20% by weight KOH solution at 60° C. for 15 minutes. Then the pellets after soaking in 50% by weight ethanol solution including 0.5% hydrazine for 3 minutes are extracted from the solution, dried at room temperature and stored in a desiccator.

The pellets whose amount of additives are changed are also made in a similar manner.

EXAMPLE 8

0.01% by weight CdO powder, 0.003% by weight $TeO_2$ powder and 0.003% by weight $Tl_2O_3$ powder are added to 95% by weight divalent silver oxide (AgO) powder, and further 5% by weight polytetrafluoride ethylene powder is added and mixed for 1 hour. The mixture is changed into particles and sifted and molded by pressure of 8 ton/cm² to make pellets. The pellets are soaked in 50% by weight methanol solution including 0.1% by weight tartaric acid and 5% by weight KOH solution for 1 hour and washed. Further the pellets are soaked in 10% by weight KOH solution including 2% by weight potassium persulfuric acid for 15 minutes and thouroughly washed. Then the pellets are soaked in 10% by weight KOH solution including 1% by weight tartaric acid for 20 minutes. After the reduction the pellets are dried at 40°-50° C. and stored in a desiccator. The pellets whose amount of additives are changed are also made in a similar manner.

EXAMPLE 9

0.1% by weight $Cd(OH)_2$ powder, 0.03% by weight $Te(OH)_6$ powder and 0.03% by weight TLOH powder are added to 96% by weight AgO powder, and 4% by weight polyethylene powder is added and mixed for 1 hour. The mixture is clanged to particles, sifted, and molded by pressure of 8 ton/cm² to make pellets. The pellets are soaked in methanol solution including 1% KOH for 30 minutes and washed. Further the pellets are soaked in 20% by weight KOH solution at 60° C. for 15 minutes and washed. Then the pellets after soaking in 50% by weight ethanol solution including 0.5% by weight hydrazin for 3 minutes are extracted and dried at room temperature and stored in a desiccator. The pellets whose amount of additives are changed are also made in a similar manner.

A divalent silver oxide cell shown in FIG. 5 is fabricated by the use of a positive electrode mixture made as illustrated above. This cell is of TR926W type in a similar manner to Example 6.

The low-temperature characteristics, self-discharge rate and leakage occurrence rate of new cells stored for 3 months at room temperature have been examined.

Table 5 shows the result. As clearly understood from Table 5, new cells ①-⑨ are extremely excellent in comparison with the conventional cell with respect to the self-discharge rate and the leakage occurrence rate. It is found from Table 5 that the amount of additives to keep the low-temperature characteristics at proper value and to reduce the self-discharge rate is in the range of 10-5000 PPM.

TABLE 5

| | | Weight % of additives to total weight of AgO mixture | | | Low-temperature characteristic (V) | Self-discharge rate (%) | Leakage occurrence rate (%) |
|---|---|---|---|---|---|---|---|
| conventional cell | | — | — | — | 1.27 | 15 | 30 |
| New cell | | | | | | | |
| Example 7 | 1 | CdO 0.01 | $TeO_2$ 0.003 | — | 1.27 | 10 | 15 |
| | 2 | 0.10 | 0.03 | — | 1.27 | 8 | 13 |
| | 3 | 0.39 | 0.13 | — | 1.04 | 7 | 12 |
| Example 8 | 4 | CdO 0.01 | $TeO_2$ 0.003 | $Tl_2O_3$ 0.003 | 1.27 | 8 | 12 |
| | 5 | 0.10 | 0.03 | 0.03 | 1.27 | 7 | 10 |
| | 6 | 0.30 | 0.10 | 0.10 | 1.02 | 4 | 8 |
| Example 9 | 7 | $Cd(OH)_2$ 0.01 | $Te(OH)_6$ 0.003 | TlOH 0.003 | 1.26 | 8 | 15 |
| | 8 | 0.1 | 0.03 | 0.03 | 1.26 | 7 | 11 |
| | 9 | 0.3 | 0.1 | 0.1 | 1.02 | 5 | 8 |

Figure 10:
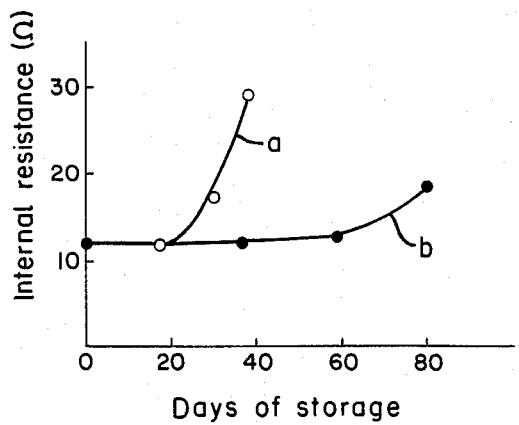
FIG. 10 shows the relationship between the days of storage and the internal resistance.

FIG. 10 shows the variation in the internal resistance of a conventional cell and a new cells after storage at 60° C. The figure shows that the internal resistance of a conventional cell "a" becomes larger after 40 days storage, while the internal resistance of a new cell "b" scarcely becomes larger after 80 days storage.

This is why the silver layer 13 is completely insulated from the divalent silver oxide cathode 12.

The completely insulation of AgO cathode from the Ag layer was obtained as follows. The surface of AgO cathode was treated by three treatment process such as 1. reduction treatment, 2. oxidation treatment, 3. reduction treatment. First, the surface of the AgO cathode was reduced to $Ag_2O$ by reduction treatment using a weak reducing agent. In this case, the surface of the AgO cathode will be partially reduced to Ag from AgO. Namely, this $Ag_2O$ layer is electrically conductive since it is composed of Ag and AgO.

Second, the $Ag_2O$ layer on the AgO cathode was oxidized using oxidizing agent and metal Ag located with $Ag_2O$ in the $Ag_2O$ layer became $Ag_2O$. Namely, the $Ag_2O$ layer became 100% $Ag_2O$ and a perfect insulated layer.

Finally, the $Ag_2O$ layer treated by oxidation treatment was reduced to the Ag layer using strong reducing agent.

In conclusion, the Ag layer on the AgO cathode is not oxidized by reaction of $AgO+Ag \rightarrow Ag_2O$ due to the complete insulation of the AgO cathode from the Ag layer.

As illustrated, the present invention provides a divalent silver oxide cell with excellent low-temperature characteristics to prevent the enlargement of the internal resistance and with excellent storing characteristic and leakage resistant characteristic by an oxidizing treatment on the divalent silver oxide cathode including additives of 10–5000 PPM after weak reduction treatment to thereby complete insulation between divalent silver oxide cathode and silver layer.

Lastly, a method of improving the low-temperature closed circuit voltage of the cells when a reduction treatment is made to the surface of the positive electrodes using a new AgO and a conventional AgO with identical amount of reduction is illustrated by equating the thickness of a reduced silver layer on the surface of the positive electrode using the new AgO with the positive electrode using the conventional AgO.

EXAMPLE 10

Positive electrode pellets of TR616SW type (outer diameter: 6.8 mm, height: 1.6 mm) are fabricated by the use of the new AgO and a conventional AgO, and a silver layer is formed by making the reduction treatment on the surface of the pellet.

CdO, $TeO_2$ and $Tl_2O_3$ are added to the new AgO by 0.3%, 0.1% and 0.1% in the form of Cd, Te and Tl respectively.

Table 6 shows (A) the thickness of silver layer on the positive pellet, (B) the amount of reduction treatment and A/B of the new AgO and the conventional AgO.

TABLE 6

| Reduction of pellet (TR616SW) with new and conventional AgO | | | |
|---|---|---|---|
| AgO | A Ag layer thickness ($\mu$) | B Reduction treatment (mAh) | A/B ($\mu$/mAh) |
| New | 51 | 11.7 | 4.36 |
| Conventional | 59 | 7.3 | 8.08 |

As understood from Table 6, since the new AgO is quite stable in comparison with the conventional AgO, the silver layer on the surface of the positive electrode is thinner than the conventional AgO in the same reduction treatment, and the closed circuit voltage of the new cell is lower than the conventional cell by 70–100 mV.

Accordingly, it is found that the low-temperature closed circuit voltage is improved when corresponding to a thickness of between about 51 to 59 $\mu$m silver layer between 4.4 $\mu$mAh and 8.1 $\mu$mAh is formed on the surface of the positive electrode of the new cell.

The effect of improvement is remarkable by comparing this example with the afore-mentioned examples 6–9.

As illustrated, the present invention provides a divalent silver oxide cell with excellent low-temperature characteristics, storing characteristics and leakage resistant characteristics. The present invention has a great industrial value and is applicable to pace maker, electronic watch, camera, electronic calculator, hearing aid and other devices.

What is claimed is:

1. A divalent silver oxide cell comprising: a negative electrode; a positive electrode comprised of an AgO mixture containing metal elements of cadmium and tellurium, the amount of said metal elements being more than 10 PPM and less than 500 PPM by weight of AgO in said AgO mixture, the amount of the cadmium element being more than 10 PPM and less than 300 PPM by weight of AgO and the amount of the tellurium element being more than 10 PPM and less than 100 PPM by weight of AgO, the AgO mixture also containing at least one component selected from the group consisting of lead, mercury, thallium, germanium, yttrium, tin, tungsten, lanthanum, a rare earth element, zinc, selenium, and aluminum, in an amount of more than 10 PPM and less than 100 PPM by weight of AgO, said positive electrode being surrounded by an $Ag_2O$ layer which is free of metallic elements, and a silver layer on at least a part of the outer surface of the $Ag_2O$ layer; a separator between said negative electrode and said positive electrode; and an electrolyte.

2. A divalent silver oxide cell according to claim 1, in which said silver layer is formed by reducing said AgO of the positive electrode.

3. A divalent silver oxide cell according to claim 1 or 2, in which said positive electrode consists of 95 to 99% AgO mixture and 1 to 5% organic binder agent by weight.

4. A divalent silver oxide cell according to claim 1, in which the thickness of the silver layer is in the range of from about 51 to less than about 59 $\mu$m.

5. The divalent silver oxide cell according to claim 1, in which said silver layer is formed by subjecting a surface layer of said AgO of the positive electrode to reduction, then oxidizing the thus reduced surface layer and finally subjecting the surface of the oxidized layer to reduction.

6. The divalent silver oxide cell according to claim 5, in which the surface layer of said AgO of the positive electrode is reduced to a layer of $Ag_2O$ which also contains metallic silver and $Ag_2O$, the reduced layer is oxidized to form a layer containing substantially 100% $Ag_2O$ and the surface of the oxidized layer is reduced to metallic silver.

7. The divalent silver oxide cell according to claim 5, in which the oxidation and reduction reactions are carried out by means of chemical oxidation and reduction agents.

* * * * *